United States Patent

[11] 3,591,898

[72] Inventor Duane S. Stenmo
 Rush City, Minn.
[21] Appl. No. 859,943
[22] Filed Sept. 22, 1969
[45] Patented July 13, 1971
[73] Assignee Herter's, Inc.
 Waseca, Minn.

[54] MOLDING OF ALL-PLASTIC SHOT SHELL CASES
 2 Claims, 2 Drawing Figs.
[52] U.S. Cl. .................................................. 18/42 D
[51] Int. Cl. .................................................... B29c 1/14
[50] Field of Search ............................................ 18/30 RM,
 30 WJ, 30 WC, 30 WM, 30 WN, 42 D

[56] References Cited
UNITED STATES PATENTS
2,339,443 1/1944 Wilson .......................... 18/42 D
2,524,858 10/1950 Thomas ......................... 18/42 D
2,929,105 3/1960 Starck et al. .................. 18/42 D Primary Examiner—H. A. Kilby, Jr.
Attorneys—Williamson, Palmatier & Bains, George F. Williamson, H. Dale Palmatier and Herman H. Bains ABSTRACT: The molding of all-plastic shot shell cases wherein the case has a base wall with substantially smooth inside and outside surfaces and the case sidewall which has a smooth interior surface and a smooth or striated or slightly corrugated outer surface is integral therewith; gating the plastic into the mold at the center of the base wall and causing the plastic to flow first to all portions of the periphery of the base wall and then progressively along all portions of the longitudinal case sidewall, the mold ejecting the case by a sleeve bearing against the open end of the case sidewall to loosen the case from the mold core and an ejector pin within the core completing ejection of the case from the cavity.

INVENTOR.
DUANE S. STENMO
BY
Williamson, Palmatier & Bains
ATTORNEYS

MOLDING OF ALL-PLASTIC SHOT SHELL CASES

BRIEF SUMMARY OF THE INVENTION

The mold assembly for the all-plastic shot shell case gates the plastic into the mold cavity at a location centrally of the base wall of the case being molded and the plastic flows radially in all directions to first form the base wall of the case and then simultaneously to all peripheral portions of the case sidewall, progressively from the end immediately adjacent the base wall to the open mouth end of the case. The ejection of the case from the mold assembly when opened is effected by a sleeve bearing against the end edge of the case wall so as to push the case off the mold core. The ejection is then completed by an ejector pin sliding through the core after the end of the pin has formed the inside surface of the base wall of the case during the molding.

The all-plastic shot shell case can be molded of a number of plastics or a mixture of plastics, such that the case has sufficient tensile, shear and impact strength as to withstand the pressures encountered upon firing a shot shell in the chamber of a shotgun. The plastic may be polycarbonate, or may be a mixture of polycarbonate and other plastics, such as polyethylene; the polycarbonate is commercially available from several places, such as Lexan from General Electric Company, Schenectady, New York, and other equivalent materials.

DETAILED DESCRIPTION OF THE INVENTION

Figure 2:
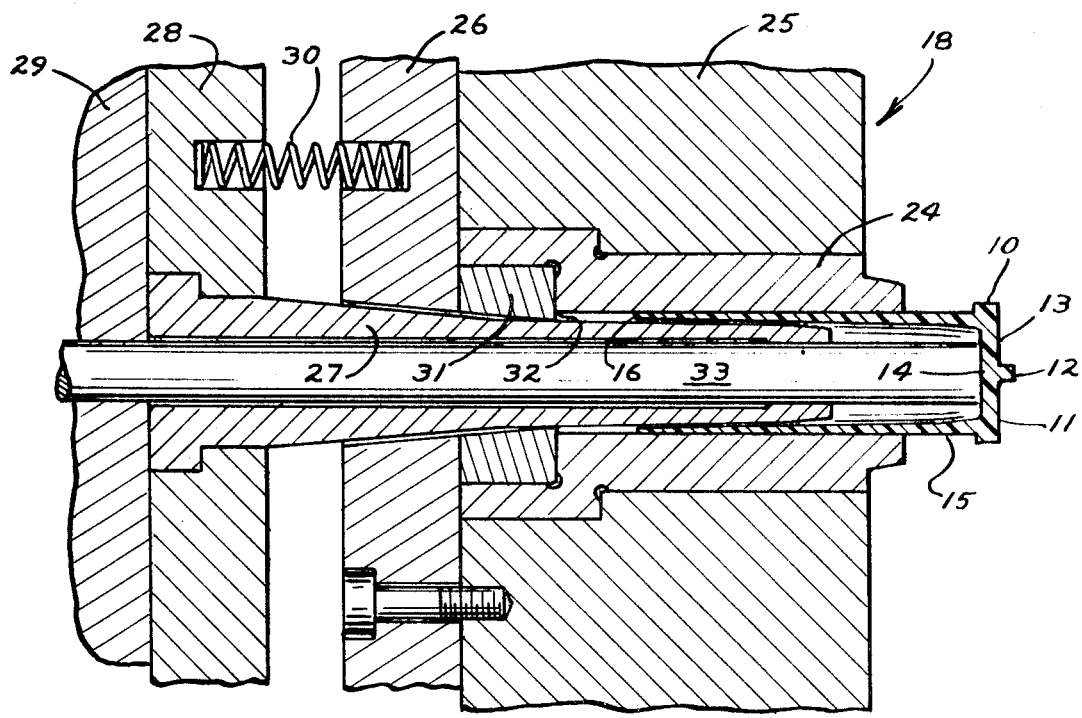
FIG. 2 is a detail section view of the movable mold assembly shown in shifted position during which ejection of the molded shot shell case is being effected.

The all-plastic shot shell case made according to the present invention is illustrated in FIG. 2 and is indicated by the numeral 10. In FIG. 2 the molded case is being ejected from the mold assembly and is complete and ready for further processing in the formation of a shot shell. The case 10 has a base wall 11 and a central sprue 12. The outer surface 13 of the base wall may have letters or numerals formed as depressions therein, or it may be that the outer surface 13 will be smooth without such lettering or numbers. The inner surface 14 of the base wall 11 is essentially smooth.

The case sidewall 15 has a smooth inner surface and a smooth or striated or slightly corrugated outer surface, and, although it is substantially of uniform thickness throughout the length, it may taper to a slightly thinner dimension at the extreme outer end, opposite the base wall 11. The end edge 16 of the case sidewall is smooth and free of any irregularities and is therefore well adapted for crimping to form the closure for the shot shell when the shot shell is loaded with powder and shot, and wadding.

With respect to the formation of a shot shell from the case 10, it should be understood that the central portion of the base wall 11 will be bored out to remove the sprue 12 and to form a primer hole for receiving the primer which will be gripped and held in the proper location by a soft plastic base wad which will be formed of polyethylene or other soft and resilient plastic material.

The case will thereupon receive its usual charge of powder, wadding, preferably a shot cup, and then the shot charge and closure. The closure may be effected by the use of a closure wad or by the use of a star crimp.

Because the primer hole at the central portion of the base wall 11 is bored out, the gating of the plastic into the mold for forming the case 10 can be effected at the center of the base wall without forming any imperfections in the molded part which are frequently associated with the gating of any plastic part being molded. It is very desirable that the gating of a plastic be effected at the center of the base wall so that the plastic, as it is filling the cavity, will fill all peripheral portions simultaneously, progressively radially outwardly across the base wall 11 in all directions and then longitudinally along the sidewall 15 so that the entire case 10 is formed without any weld seams in the plastic due to flow of plastic in filling the mold cavity.

Figure 1:
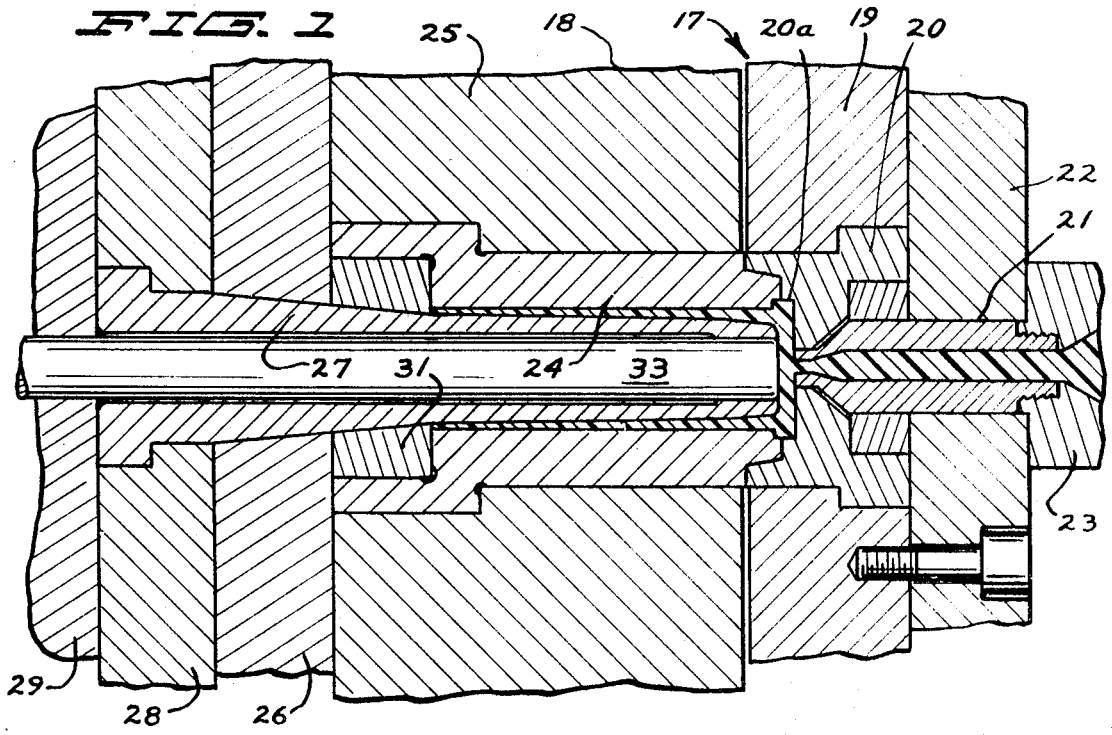
FIG. 1 is a section view of the principal elements of the mold assembly shown in closed condition during the formation of an all-plastic shot shell case.

The mold assembly illustrated in FIGS. 1 and 2 includes a stationary mold assembly, indicated in general by numeral 17, and a movable mold assembly 18 which is mounted on the ram of the mold press and moves with the ram. The stationary mold assembly 17 includes a mounting plate 19 which carries the insert part 20 which receives the nozzle 21. The insert is held in the mounting plate 19 by the clamp plate 22 which also mounts the plastic manifold 23 through which the plastic material is delivered to the nozzle 21, and, as seen, the nozzle 21 may be connected to the manifold in any suitable way, such as the threads as illustrated. Of course, suitable cooling is applied to all of the parts associated with the stationary mold assembly 17 so as to maintain the plastic at predetermined temperatures for proper gating.

The insert part 20 defines the mold surface 20a for forming the outside of the base wall 11 of the shot shell. The insert part 20 also defines mating surfaces for mating with the cavity part 24 of the movable mold assembly 18.

The movable mold assembly 18 also includes a mounting plate 25 which mounts the cavity part 24, and a clamp plate 26 secured to the mounting plate 25 for retaining the cavity part 24 in the desired position. The movable mold assembly 18 also includes the hollow core 27 extending through the cavity part 24 to the end face thereof for forming the inside surfaces of the shot shell case 10 being molded. The hollow core 27 is mounted in a plate 28 and secured therein by a clamp plate 29 affixed to the mounting plate 28. The cavity part 28 is slidable along the core 27 for producing the initial ejection movement of the molded part or case 10 when the mold is opened, and, as illustrated in FIG. 2, the mounting plate 25 together with the clamp plate 26 is urged along the core 27 by a spring construction 30 or an equivalent spring construction elsewhere on the mold assembly. A stripper sleeve 31 is mounted in the cavity part 24 and is held therein by the clamp plate 26. The sleeve 31 has a shoulder surface 32 which defines the end of the cavity between the core 27 and the cavity part 24, thereby forming the end edge 16 of the shot shell case 10. The sleeve 31 also bears against this end edge 16 of the case after the part is formed and as the mold is being opened so that the sleeve 31 produces the initial endwise movement of the case 10 along the core 27.

In FIG. 2, the initial movement of the case along the core 27 has already been completed, and the additional ejecting movement of the case 10 is being produced by the central core pin 33 which extends through the hollow core 27 with the end of the core pin 33 defining the inside surface or face 14 of the base wall 11 of the shot shell case.

In FIG. 2, the ejector pin 33 is shown advanced well beyond the end of the core 27 so as to produce the final ejection of the case, loosening and moving the case 10 out of the cavity part 24. The ejector pin 33 is operated by a motion separate from the motion of the ram of the press in which the mold assembly is mounted.

It will be seen that I have provided for molding of a plastic shot shell case by gating the plastic into the cavity from the central area of the base wall of the shot shell case being formed which base wall is bored out in order to define a primer hole before the actual shot shell is completed for firing. The mold assembly separates and the initial movement of the completed shot shell case off the core is produced by the stripper sleeve which bears against and moves the end edge surface of the peripheral sidewall of the case, thereby preventing the formation of any part-weakening ejection marks. The case being formed in the cavity is produced without any weld lines whatever because of the simultaneous filling around the entire periphery of the cavity and then progressively outwardly across the base wall and then progressively along the sidewall as the cavity is being filled.

I claim:
1. A mold assembly for producing all-plastic shot shell cases,
   a stationary mold assembly including an insert part forming the base wall of the shot shell case and having a nozzle gating plastic centrally of the base wall of the shot shell case being formed,
   a movable mold assembly to be operated by the ram of the mold press for opening and closing the mold, said movable mold assembly including a core forming the inside of the shot shell case, a cavity mold part encompassing the core and defining the cavity in which the case is formed, the cavity part cooperating with the insert part of the stationary assembly to close the mold, said cavity part including a stripper sleeve encompassing the core in close relation to define the end of the cavity and to form the end edge of the shot shell case sidewall, the cavity part being movable along the core when the mold is open to initiate ejection of the shot shell case from the core as the stripper sleeve slides along the core, the core having a longitudinal central opening through which an ejector pin extends and slides, to remove the case from the cavity part by pushing against the inside of the base wall of the case being formed.

2. The invention according to claim 1 and said core and said stripper sleeve having mating tapers engaging each other and retaining the core concentric of the cavity.